US 9,258,355 B2

(12) United States Patent
Chandra et al.

(10) Patent No.: US 9,258,355 B2
(45) Date of Patent: Feb. 9, 2016

(54) DECENTRALIZED CLOUD WORKFLOWS

(71) Applicant: EMPIRE TECHNOLOGY DEVELOPMENT LLC, Wilmington (DE)

(72) Inventors: Saurabh Chandra, Bangalore (IN); Venkat Sunder Raman Rangasumadram Komaleeswaran, Bangalore (IN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 271 days.

(21) Appl. No.: 13/822,201

(22) PCT Filed: Nov. 12, 2012

(86) PCT No.: PCT/US2012/064654
§ 371 (c)(1),
(2) Date: Mar. 11, 2013

(87) PCT Pub. No.: WO2014/046694
PCT Pub. Date: Mar. 27, 2014

(65) Prior Publication Data
US 2014/0089390 A1 Mar. 27, 2014

(30) Foreign Application Priority Data
Sep. 24, 2012 (IN) .......................... 3955/CHE/2012

(51) Int. Cl.
*G06F 15/16* (2006.01)
*H04L 29/08* (2006.01)
*G06Q 10/06* (2012.01)
*G06Q 10/10* (2012.01)

(52) U.S. Cl.
CPC ............ *H04L 67/08* (2013.01); *G06Q 10/0633* (2013.01); *G06Q 10/103* (2013.01); *H04L 67/34* (2013.01); *G06Q 10/06* (2013.01); *G06Q 10/06316* (2013.01); *H04L 67/2838* (2013.01)

(58) Field of Classification Search
CPC ....... G06Q 10/06; G06Q 10/00; G06Q 10/08; G06Q 10/103
See application file for complete search history.

(56) References Cited

U.S. PATENT DOCUMENTS

2003/0023472 A1   1/2003  Lee et al.
2006/0259603 A1*  11/2006 Shrader et al. ................ 709/223
(Continued)

FOREIGN PATENT DOCUMENTS

WO  PCT/US2012/064654    11/2012

OTHER PUBLICATIONS

International Searching Authority, International Search Report and Written Opinion of the International Searching Authority for PCT/US12/64654, Jan. 22, 2013.

(Continued)

*Primary Examiner* — Joseph E Avellino
*Assistant Examiner* — Rachel J Hackenberg
(74) *Attorney, Agent, or Firm* — Jensen & Puntigam, PS

(57) ABSTRACT

Technologies related to decentralized cloud workflows are generally described. In some examples, client applications may generate workflow packages. The workflow packages may be used to access multiple network services, such that client applications need not communicate with intermediate network services in a network service workflow. A client application may send a workflow package to a first network service in the network service workflow. The first network service may process instructions in the workflow package, store transaction results, and forward the workflow package to a next network service. Each intermediate network service may similarly process instructions, store transaction results, and forward the workflow package. Ultimately a last network service in the network service workflow may send workflow completion information to the client application.

30 Claims, 8 Drawing Sheets

(56) References Cited

U.S. PATENT DOCUMENTS

| | | | |
|---|---|---|---|
| 2009/0037425 A1 | 2/2009 | Erickson et al. | |
| 2009/0077217 A1 | 3/2009 | McFarland et al. | |
| 2009/0313300 A1 | 12/2009 | Dettori et al. | |
| 2012/0079490 A1 | 3/2012 | Bond et al. | |
| 2013/0218618 A1* | 8/2013 | Purcell | G06F 9/5072 705/7.13 |
| 2014/0081698 A1* | 3/2014 | Oppitz | G06F 9/5072 705/7.26 |
| 2014/0372324 A1* | 12/2014 | Mercuri | G06Q 10/103 705/301 |

OTHER PUBLICATIONS

Jie Meng et al.; "An Ad-Hoc Workflow System Architecture Based on Mobile Agents and Rule-Based Processing"; paper; Computer and Information Science and Engineering; University of Florida, Gainesville FL, 2000.

Amazon Web Services; "Why Are Customers Adopting Cloud Computing?" internet article from website http://aws.amazon.com; accessed Feb. 20, 2013.

Google Developers; "Google Translate API Pricing"; internet article from website http://code.google.com/apis/language/translate/v2/pricing.html; Apr. 20, 2012.

Encoding.Com; "Complete Transcoding Features"; internet article from website http://www.encoding.com/features; accessed Feb. 20, 2013.

Bittencourt, L.F.; "Enabling execution of service workflows in grid/cloud hybrid systems"; paper appearing in Network Operations and Management Symposium Workshops; 2010 IEEE/IFIP; p. 343-349.

* cited by examiner

DECENTRALIZED CLOUD WORKFLOWS

CROSS-REFERENCE TO RELATED APPLICATIONS

This Application is a U.S. National Stage Application filing under 35 U.S.C. §371 of PCT Application No. PCT/US2012/064654, entitled "DECENTRALIZED CLOUD WORKFLOWS", filed on Nov. 12, 2012, which is an International Application that claims priority under 35 U.S.C. §365 of India Patent Application No. 3955/CHE/2012, entitled "DECENTRALIZED CLOUD WORKFLOWS", filed on Sep. 24, 2012. The disclosures of the PCT Application and the India Patent Application are incorporated by reference herein in their entireties.

BACKGROUND

Unless otherwise indicated herein, the materials described in this section are not prior art to the claims in this application and are not admitted to be prior art by inclusion in this section.

Mainstream computer use is evolving from individually managed, stand-alone computing devices to connected devices that access software and/or data via a network connection. "Cloud computing" refers to a computing model in which computing resources may be accessed via a network connection. Resources available from the network may be referred to as "in the cloud".

Behind a network connection, a "cloud" may comprise professionally managed hardware and software. Data center/infrastructure providers may supply hardware infrastructure itself, e.g., racks and rows of servers comprising processors, memory, cabling, cooling systems, raw storage, firewalls, and load balancers. "Platform as a Service" (PaaS) providers may supply platform layers that use infrastructure provider hardware. Platform layers may include, for example, computing platforms such as operating systems, programming language execution environments, databases, and web servers. "Software as a Service" (SaaS) providers may supply software layers that use platform providers' platforms. SaaS software layers may include, for example, application software implementing network services that can be made available in a cloud to client applications operated by end users and/or other network services.

SUMMARY

The present disclosure generally describes technologies including devices, methods, and computer readable media relating to decentralized cloud workflows. Some example methods may be directed to accessing network services by client workflow managers executing on computing devices coupled to a network. Example methods may include generating a workflow package by a client workflow manager; sending the workflow package to a first network service in a network service workflow; and/or receiving workflow completion information from a last network service in the network service workflow without further interaction between the client workflow manager and the first network service or intermediate network services in the network service workflow.

Some example methods may be directed to processing a network service workflow by a network service executing on a server coupled to a network. Example methods may include receiving, by the network service, a workflow package; executing an instruction set from the workflow package to effect a custom transaction on behalf of the client application; storing transaction result information in a storage location designated in the workflow package; and/or identifying a next network service in the network service workflow or a return to the client application. When a next network service is identified in the network service workflow, the network service may send the workflow package to the next network service without interaction between the client application and the network service. When a next network service is not identified in the network service workflow, the network service may send workflow completion information to the client application.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a client application or network service configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
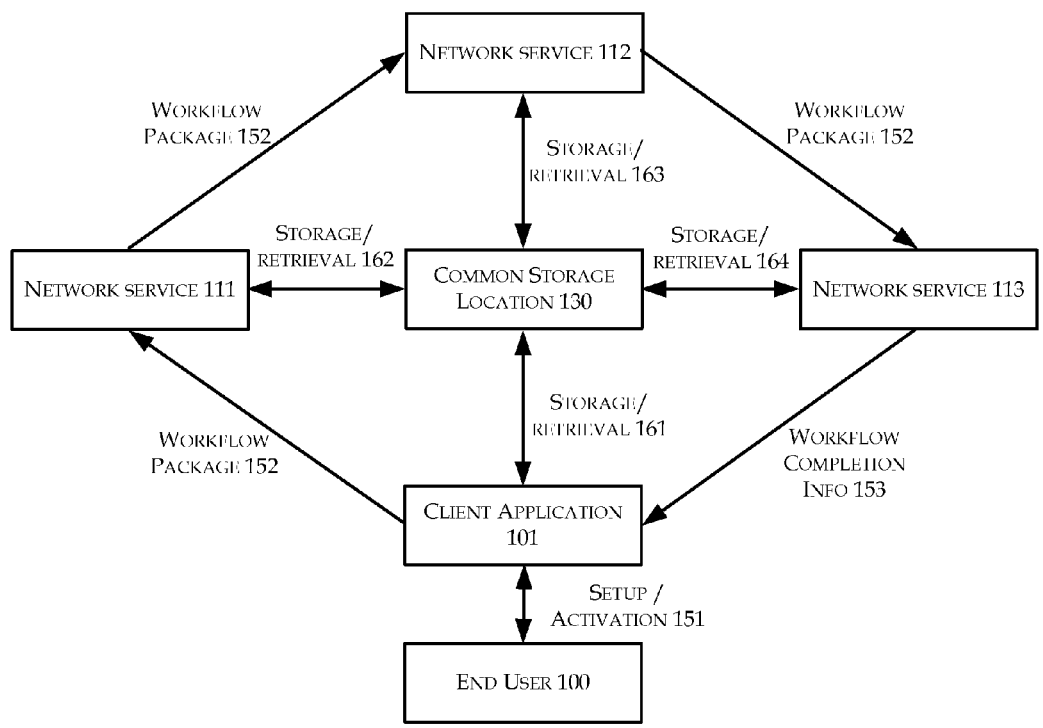
FIG. 1 is a schematic diagram illustrating an example decentralized cloud workflow.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to decentralized cloud workflows. In some examples, client applications may generate workflow packages. The workflow packages may be used to access multiple network services, such that client applications need not communicate with intermediate network services in a network service workflow. A client application may send a workflow package to a first network service in the network service workflow. The first network service may process instructions in the workflow package, store transaction results, and forward the workflow package to a next network service. Each intermediate network service may similarly process instructions, store transaction results, and forward the workflow package. Ultimately a last network service in the network service workflow may send workflow completion information to the client application.

Cloud technologies increasingly provide discrete network services in the cloud. The cloud itself may comprise infrastructure as a service. Queues, databases, load balancers and other software components are used as underlying building blocks of client applications being provided as services. Over time, it is expected that this trend may continue—resulting in more and more functional components of client applications becoming well defined paid network services.

Cloud-based client applications may utilize multiple network services to carry out operations. At an infrastructure level, network services accessed by client applications may comprise auto-scaling services, load balancing services, backup services, and the like. At a functional level, network services accessed by client applications may for example comprise transcoding services, search services (e.g., network services that send automated Application Programming Interface (API) search queries to third-party network services), payment processing services that connect to payment gateways to process payments, and a wide variety of other network services.

If a client application accesses multiple network services directly, i.e., with a first communication between the client application and a first network service, a second communication between the client application and a second network service, and so on, without the benefit of using a workflow package according to this disclosure, then service calls may go to each network service one at a time and the responsibility to orchestrate the network services is with the client application. Moreover, for utilizing N network services, such an approach incurs at least 2N transactions by the client application. There are several problems with this approach. First, the various network service providers may have a single coordinator (the client application) and may be susceptible to failure of the coordinator. Second, the network services may be disconnected from each other; the responsibility of a successful operation and Quality of Service (QOS) may depend on the client application; and rollback of all network services due to failure of one network service may be impossible. Third, the client application may not have access to the progress in executing a task by a network service without an explicit mechanism, which may be proprietary to each network service. If any of the network services suffers a failure or has an error in processing a client application request, the client application may have no direct insight into the cause of the failure, and thus may have to depend on the network service for support. Fourth, client application developers may spend more time in developing solutions since they need to know APIs of each network service, which may not be standardized. Fifth, client application developers may be discouraged to engage with larger numbers of network services in a pipeline and there may be a tendency to over-develop client application functions internally rather than rely on network services. Sixth, network services may sometimes lose out to competition due to insufficient integration options rather than core functionality.

Embodiments of this disclosure may be directed to utilization by client applications of network services hosted in the cloud. A client application may generate a workflow package configured for consumption by multiple network services. The client application may send the workflow package to the first network service in the network service workflow, and the client application need not communicate with intermediate network services thereafter. Each network service may process the workflow package to complete its particular task, and may hand the workflow package to the next network service in the network service workflow. As each network service executes its task, it may optionally log its activity in a central log and/or store transaction results in a common storage location. Upon finishing a task, each network service may determine the next appropriate network service to continue the network service workflow and may send the workflow package to the next appropriate network service.

Embodiments of this disclosure may reduce communication overhead, eliminate the single point failure associated with direct communications between client applications and multiple network services, enable logging to troubleshoot network service problems and failures, and/or enable client applications to take advantage of competition between competing providers of similar network services, as described further herein.

In some embodiments, client applications may configure network service requests such that multiple network service requests, and the sequence thereof, are defined upfront in a workflow package. Each network service may process its own network service request and then send the workflow package to the next network service in the network service workflow. Such an approach may improve efficiency of the whole system including the client application and the various network services. For example, in some embodiments, the client application may perform 2 network transactions—sending the workflow package, and receiving workflow completion information. Also the total network transactions in the system may be reduced from 2N to N. Efficiency gains may be especially pronounced in scenarios where some or all network services are hosted by a same cloud provider, such as AMAZON®. A cloud provider like AMAZON® may host some or all network services used by a client application, though such network services need not necessarily be provided by a same vendor. In this case data sharing and protocol sharing may also be simplified.

In some embodiments, workflow packages may be implemented in the form of Extensible Markup Language (XML) or other declarative language packages that contain instructions necessary for carrying out network services in a network service workflow. Workflow package generation may comprise, for example: a client application may determine network services to include in a workflow package and a sequence in which network services are to be engaged; the client application may include placeholder and logger information where transaction result and/or log information may be stored by each of the network services; the client application may include information relating to expected performance and price of network services, e.g., in scenarios where similar network services may be performed by different network service providers, a price mechanism may allow execution by the most cost-effective network service provider in real time; the client application may include network service addresses, such as network service Uniform Resource Indicators (URIs) for each network service; the client application may include a payload XML package that contains transaction instructions/information for each network service; and the client application may encrypt the workflow package and/or portions thereof, using for example a network service provider's public key so that the workflow package is secured from being tampered. The client application may provide the generated workflow package, e.g., as a self-contained encoded message or URI along with workflow processing instructions, to a first network service in the network service workflow.

In some embodiments, as discussed in greater detail herein, each network service can log its operations to a central log service so that debugging and progress information may be accessed by client applications when needed. Client applications may be configured to access the central log service in the event of a failure/timeout of a network service workflow.

In some embodiments, network services may be selected by other network services in a network service workflow, on behalf of client applications in real-time, e.g., for budget optimization. For example, real-time selection of a cheapest shipping service may be delegated to a payment service (or other network service in a network service workflow), while real-time selection of a cheapest notification service may be delegated to a shipping service (or other network service in a network service workflow). In some embodiments, any of the network services may embed ads or other information in workflow packages, and the ads or other information be returned to the client application upon completion of the network service workflow.

In some embodiments, network services may be grouped into packaged offerings, e.g., a combination of payment+shipping or video transcoding+Content Delivery Network (CDN) or video transcoding+advertising+audience measurement. The packaged offerings may be accessible by workflow packages. Packaged offerings may compete with each other and with unbundled individual network services, allowing client applications to choose most appropriate combinations of network services.

Any client application operations that include several network services could benefit from embodiments of this disclosure. Example scenarios include: merchant sites that use billing, fulfillment, and shipping services; online video platforms which use transcoding, advertisement, and storage services; and analytics platforms which use data collection, pruning, mining, and visual reporting services.

In some embodiments, solutions may include methods of coordinating network service workflows of cloud-based network services that comprise individual linked network services hosted on different cloud platforms. An example use-case scenario may comprise provision of an end-to-end online service that entails several SaaS modules that are hosted on different cloud platforms, possibly by different providers. The network services may be coordinated using a workflow package to provide integrated services called for by the client application.

Some embodiments of this disclosure may employ traveling workflow processing instructions, which may also be referred to herein as a task manager. The task manager may travel with a workflow package, and may be configured to direct the flow of the workflow package from network service to network service. The task manager may be packaged in an XML or other declarative language object that encodes instructions for executing each stage of the network service workflow, along with URI's of the executing network services. The task manager may furthermore execute the workflow package as a self-contained payload. The task manager may also include or access placeholders for storing transaction results of each network service in the network service workflow, and an operations logger. The results of each network service may be reported to a central logger/storage location for access by the client application at any stage of execution.

In embodiments configured to provide dynamic, real-time selection of network services in midstream, the task manager may be configured to determine the optimum network service choice for a network service at intermediate stages, where more than one network service provider is available. The task manager may be configured to schedule the services of the selected network service provider for the network service workflow.

As noted in the summary section, some example methods may be directed to accessing network services by client workflow managers executing on computing devices coupled to a network. Example methods may include generating a workflow package by a client workflow manager; sending the workflow package to a first network service in a network service workflow; and/or receiving workflow completion information from a last network service in the network service workflow without further interaction between the client workflow manager and the first network service or intermediate network services in the network service workflow. Example workflow packages may include, inter alia, an identification of a client application; a network service workflow comprising a plurality of network services and workflow sequence information to engage the network services according to a workflow sequence; instruction sets for each of the network services in the network service workflow, each instruction set including instructions configuring a corresponding network service to perform a custom transaction on behalf of the client application; and/or result storage instructions directing storage of transaction result information by each of the network services. In some embodiments, the workflow package may comprise an XML package.

In some embodiments, the result storage instructions directing storage of transaction result information by each of the network services may direct storage to a common location for use by the network services, wherein the common location may comprise a network storage location or a location within the workflow package. In some embodiments, the workflow package may comprise one or more log storage locations directing storage of log information by each of the network services.

In some embodiments, one or more of the plurality of network services in the network service workflow may be specified using a URI. In some embodiments, one or more of the plurality of network services in the network service workflow may be specified as an identified network service type along with real-time selection criteria. In some embodiments, the plurality of network services may comprise a bundle of services that includes for example a payment service and a shipping service, a video transcoding service and a storage service, or a data collection service and a visual reporting service.

In some embodiments, the instruction sets for one or more of the network services may include one or more of a self-contained encoded message or a URI along with instructions. In some embodiments, one or more of the instruction sets for the network services in the network service workflow may include encryption instructions to encrypt transaction result information.

In some embodiments, a non-transitory computer readable storage medium may be provided, having computer executable instructions executable by a processor, the instructions that, when executed by the processor, implement a client workflow manager which causes the processor to generate a workflow package as described above in connection with methods directed to accessing network services by client workflow managers; send the workflow package to a first network service in a network service workflow; and receive workflow completion information from a last network service in the network service workflow without further interaction between the client workflow manager and the first network service or intermediate network services in the network service workflow. The computer readable storage medium may furthermore have instructions which cause the processor to carry out the various method steps described above.

In some embodiments, a computing device may be configured to provide a client workflow manager configured to engage network services on behalf of a client application. The computing device may comprise a processor, a memory, and a client workflow manager stored in the memory and executable by the processor. The client workflow manager may be configured to generate a workflow package as described above in connection with methods directed to accessing network services by client workflow managers; send the workflow package to a first network service in a network service workflow; and receive workflow completion information from a last network service in the network service workflow without further interaction between the client workflow manager and the first network service or intermediate network services in the network service workflow. The computing device may furthermore be configured to carry out the various method steps described above.

As noted in the summary section, some example methods may be directed to processing a network service workflow by a network service executing on a server coupled to a network. Example methods may include receiving, by the network service, a workflow package; executing an instruction set from the workflow package to effect a custom transaction on behalf of the client application; storing transaction result information in a storage location designated in the workflow package; and/or identifying a next network service in the network service workflow or a return to the client application. When a next network service is identified in the network service workflow, the network service may send the workflow package to the next network service without interaction between the client application and the network service. When a next network service is not identified in the network service workflow, the network service may send workflow completion information to the client application. The workflow package may include an identification of a client application; a network service workflow comprising a plurality of network services and workflow sequence information to engage the network services according to a workflow sequence; instruction sets for each of the network services in the network service workflow, each instruction set including instructions configuring a corresponding network service to perform a custom transaction on behalf of the client application; and result storage instructions directing storage of transaction result information by each of the network services. In some embodiments, the workflow package may comprise an XML package. In some embodiments, the network service may comprise a payment service, a shipping service, a video transcoding service, a storage service, a data collection service, or a visual reporting service.

In some embodiments, the result storage instructions directing storage of transaction result information by each of the network services may direct storage to a common location for use by the network services, wherein the common location comprises a network storage location or a location within the workflow package. In some embodiments, the network service may encrypt transaction result information. In some embodiments, the workflow package may comprise one or more log storage locations directing storage of log information by each of the network services, and methods may further comprise storing, by the network service, log information in a storage location from among the one or more log storage locations.

In some embodiments, identifying the next network service in the network service workflow may comprise referencing a URI in the workflow package that identifies the next network service. In some embodiments, the next network service in the network service workflow may be specified as an identified network service type along with real-time selection criteria, and identifying, by the network service, the next network service in the network service workflow may comprise determining a network service of the identified network service type according to the real-time selection criteria, from among a plurality of network services according to the identified network service type.

In some embodiments, the executed instruction set may be included in one or more of a self-contained encoded message or a URI along with instructions, and methods may further comprise opening the self-contained encoded message and/or accessing the URI to execute the instruction set.

In some embodiments, methods may further comprise receiving, by the network service, a failure notification indicating a failure to execute a transaction by a network service in the network service workflow; rolling back, by the network service, the custom transaction performed by the network service on behalf of the client application; identifying, by the network service, a previous network service in the network service workflow or the client application; and sending, by the network service, a failure notification to the identified previous network service or the client application.

In some embodiments, a non-transitory computer readable storage medium may be provided, having computer executable instructions executable by a processor, the instructions that, when executed by the processor, implement a network service which causes the processor to receive a workflow package as described above in connection with the methods directed to processing a network service workflow; execute an instruction set from among the instruction sets in the workflow package to effect a custom transaction on behalf of the client application; store transaction result information in a storage location according to the result storage instructions in the workflow package; identify a next network service in the network service workflow or a return to the client application; and when a next network service is identified in the network service workflow, send the workflow package to the next network service in the network service workflow without interaction between the client application and the network service; and when a next network service is not identified in the network service workflow, send workflow completion information to the client application. The computer readable storage medium may furthermore have instructions which cause the processor to carry out the various network service method steps described above.

In some embodiments, a server device may be configured to provide a network service. The server device may comprise a processor; a memory; and a network service stored in the memory and executable by the processor. The network service may be configured to receive a workflow package as described above in connection with the methods directed to processing a network service workflow; execute an instruction set from among the instruction sets in the workflow package to effect a custom transaction on behalf of the client application; store transaction result information in a storage location according to the result storage instructions in the workflow package; identify a next network service in the network service workflow or a return to the client application; and when a next network service is identified in the network service workflow, send the workflow package to the next network service in the network service workflow without interaction between the client application and the network service; and when a next network service is not identified in the network service workflow, send workflow completion information to the client application. The server device may furthermore be configured to carry out the various network service method steps described above.

FIG. 1 is a schematic diagram illustrating an example decentralized cloud workflow, arranged in accordance with at least some embodiments of the present disclosure. As depicted, FIG. 1 includes an end user 100, a client application 101, a network service 111, a network service 112, a network service 113, and a common storage location 130. Three network services are illustrated in FIG. 1 for simplicity of description; however it will be appreciated that embodiments may involve more or fewer network services.

In FIG. 1, end user 100 may perform a setup/activation 151 with client application 101. Client application 101 may be configured to activate a client workflow manager, e.g., client workflow manager 423 illustrated in FIG. 4, to generate and send a workflow package 152 to network service 111, wherein network service 111 is first in a workflow sequence specified in workflow package 152. Client application 101 and/or client workflow manager 423 may optionally also be configured to perform a storage/retrieval operation 161 with common storage location 130.

Network service 111 may be configured to execute an instruction set in workflow package 152 to perform a transaction on behalf of end user 100 and/or client application 101. Network service 111 may optionally be configured to perform storage/retrieval operations 162 with common storage location 130 to carry out the transaction and/or store transaction results. Network service 111 may be configured to identify next network service 112 in the workflow sequence specified in workflow package 152, and to send workflow package 152 to next network service 112.

Network service 112 may be configured to execute an instruction set in workflow package 152 to perform a transaction on behalf of end user 100 and/or client application 101. Network service 112 may optionally be configured to perform storage/retrieval operations 163 with common storage location 130 to carry out the transaction and/or store transaction results. Network service 112 may be configured to identify next network service 113 in the workflow sequence specified in workflow package 152, and to send workflow package 152 to next network service 113.

Network service 113 may be configured to execute an instruction set in workflow package 152 to perform a transaction on behalf of end user 100 and/or client application 101. Network service 113 may optionally be configured to perform storage/retrieval operations 164 with common storage location 130 to carry out the transaction and/or store transaction results. Network service 113 may be configured to identify a return to client application 101 in the workflow sequence specified in workflow package 152, and to send workflow completion information 153 to client application 101.

In some embodiments, client application 101 may itself be implemented as a network service. End user 100 may employ an end user device such as a personal computer or mobile device equipped with a browser or other software configured to interact with client application 101 via a network connection to a server comprising client application 101. Any of client application 101, network services 111, 112, and 113, and common storage location 130 may be implemented within a same data center, or at different data centers. Connections between client application 101, network services 111, 112, and 113, and/or common storage location 130 may therefore be implemented as local network connections, e.g. Local Area Network (LAN) type network connections, or as remote network connections, e.g., as Wide Area Network (WAN) type network connections, as appropriate.

In some embodiments, client application 101 may comprise an application at a client device operated by end user 100, and network services 111, 112, and 113, and common storage location 130 may comprise applications/storage in the cloud, i.e., at servers accessible via a network connection. Client application 101 may for example be coupled to network services 111 and 113, and to common storage location 130, via a Wide Area Network (WAN) type network connection. Meanwhile, network services 111, 112, and 113, and common storage location 130 may be coupled to one another via WAN or Local Area Network (LAN) type network connections, as appropriate, depending on whether network services 111, 112, and 113, and common storage location 130 are implemented within a same data center. For example, when network services 111, 112, and 113, and common storage location 130 are all implemented within a same data center, connections between these components may be implemented as local network connections.

In some embodiments, client application 101 may be developed using a software development framework. Software development frameworks generally assist in creating applications by providing a variety of software development tools as will be appreciated. In some embodiments, a software development framework may include one or more tools configured to insert client workflow manager 423 into client application 101 during design of client application 101.

The terms "client device" and/or "client computing device" are used herein to refer to a device comprising client application 101, regardless of whether client application 101 is implemented as a network service or locally at an end user device. A client device may therefore comprise a server in some embodiments, wherein the server is a client of other network services, as will be appreciated by those of skill in the art. The term "network service device" and/or "network service computing device" are used herein to refer to a device comprising a network service, such as one or more of network services 111, 112, and/or 113. It will also be appreciated those of skill in the art that in some embodiments, client application 101 and one or more of network services 111, 112, and/or 113 may be implemented on a same computing device in the cloud.

In some embodiments, setup/activation 151 may comprise one or more workflow setup interactions between end user 100 and client application 101 to receive workflow configuration data that client application 101 may provide to client workflow manager 423 to generate workflow package 152. For example, client application 101 may be configured to enable end user 100 to purchase eBook translations. Setup/activation 151 may comprise receiving, by client application 101, workflow configuration data such as network service identification, sequence, and/or transaction data. In the eBook translation example, workflow configuration data may include a selection of an eBook to translate, a selected language to translate the eBook into, a selected translation service, formatting selections for the eBook, payment information, and/or eBook delivery instructions. In general, network services included in workflow package 152 may comprise any bundle of services. Payment and shipping services, video transcoding and storage services, and data collection and visual reporting services are all examples of network services that may be bundled in workflow package 152.

Client application 101 may be configured to provide received workflow configuration data to client workflow manager 423 to generate workflow package 152 including received workflow configuration data. Example workflow packages are described in connection with FIG. 2 and FIG. 3. In general, workflow package 152 may comprise, inter alia, an identification of client application 101, identifications of network services, workflow sequence information, instruction sets for each of the network services to perform custom transactions on behalf of client application 101, and result storage instructions directing storage of transaction result information by each of the network services.

In the eBook translation example, workflow package 152 may identify network services 111, 112, and 113, and workflow sequence information may indicate that network service 111 is to be performed first, network service 112 is to be performed second, and network service 113 is to be performed third/last. Network service 111 may provide a payment processing service, network service 112 may provide a translation service, and network service 111 may provide an eBook formatting and delivery service.

Workflow package 152 may comprise an instruction set for network service 111 to perform a custom transaction including processing a payment according to end user 100 payment data. Workflow package 152 may comprise an instruction set for network service 112 to perform a custom transaction including translating a selected eBook into a selected language according to end user 100 eBook and language translation selections. Workflow package 152 may comprise an instruction set for network service 113 to perform a custom transaction including formatting translated eBook text in a translated eBook, and delivering the translated eBook to end user 100.

Client application 101 and/or client workflow manager 423 may be configured to initiate a network service workflow in response to an activation command received from end user 100. Client application 101 and/or client workflow manager 423 may be configured to initiate the network service workflow by identifying first network service 111 in workflow package 152, and sending workflow package 152 to first network service 111. In some embodiments, client application 101 and/or client workflow manager 423 may be configured to store workflow information as may be needed by any of network services 111, 112, and/or 113 in common storage location 130, for use by network services 111, 112, and/or 113 when carrying out various custom transactions according to the network service workflow. Workflow information stored in common storage location 130 may be identified for example with a client application identifier (ID) and/or a workflow package ID, allowing network services 111, 112, and/or 113 to look up information in common storage location 130 for the purpose of performing transactions according to the network service workflow.

Each of network services 111, 112, 113, may generally be configured to receive workflow package 152, extract custom transaction instructions from workflow package 152, perform extracted custom transaction instructions according to instructions in workflow package 152, store custom transaction results according to storage instructions in workflow package 152, identify a next network service or a return to client application 101 and/or a return to client workflow manager 423 according to the network service workflow, and either send workflow package 152 to the next network service, or send workflow completion information 153 to client application 101 and/or to client workflow manager 423.

In the eBook translation example, network service 111 may be configured to receive workflow package 152 from client application 101 and/or client workflow manager 423, extract custom payment transaction instructions from workflow package 152, perform extracted custom payment transaction instructions, store custom payment transaction results according to storage instructions in workflow package 152, identify network service 112 as the next network service, and send workflow package 152 to next network service 112.

Network service 112 may be configured to receive workflow package 152 from network service 111, extract custom transaction instructions including an eBook selection and a translation language selection from workflow package 152, perform extracted custom translation transaction instructions, store custom translation transaction results according to storage instructions in workflow package 152, identify network service 113 as the next network service, and send workflow package 152 to next network service 113.

Network service 113 may be configured to receive workflow package 152 from network service 112, extract custom transaction instructions including eBook formatting and delivery selections from workflow package 152, perform extracted custom eBook formatting transaction instructions, perform extracted custom eBook delivery transaction instructions, store custom formatting and delivery transaction results according to storage instructions in workflow package 152, identify a return to client application 101 and/or to client workflow manager 423, and send workflow completion information 153 to client application 101 and/or to client workflow manager 423.

Workflow completion information 153 may comprise any of a variety of data. In some embodiments, workflow completion information 153 may comprise workflow package 152. In some embodiments, workflow completion information 153 may comprise a notification that a network service workflow is complete. In some embodiments, workflow completion information 153 may comprise a result retrieval location, e.g., within common storage location 130, from which client application 101 and/or client workflow manager 423 may retrieve workflow transaction results.

Client application 101 and/or client workflow manager 423 may be configured to receive workflow completion information 153. In some embodiments, client application 101 and/or client workflow manager 423 may be configured to flag a workflow as completed, e.g., in a list of workflow orders, upon receiving workflow completion information 153. In some embodiments, client application 101 and/or client workflow manager 423 may be configured to notify end user 100 of workflow completion. In some embodiments, client application 101 and/or client workflow manager 423 may be configured to automatically retrieve stored workflow information from common storage location 130 in response to receiving workflow completion information 153.

Network services in a network service workflow may be specified within workflow package 152 using any of a variety of techniques. In some embodiments, network services may be specified using URIs and/or other unique IDs, that uniquely identify specific network services, such as for example a URI to identify a translation service provided by GOOGLE®. In some embodiments, network services may be specified by network service type and real-time selection criteria. For example, a network service may be specified as any network service having a "translation" type, along with real-time selection criteria specifying lowest cost. When identifying a next network service, network service 111 may be configured to search for network services of the specified type, poll available network services of the specified type for real time cost information, and send workflow package 152 to a lowest cost translation service. Cost is just one example of real-time selection criteria, and other real-time selection criteria such as speed, quality, geographical location, available options, vendor preferences, and/or recommendations and other third party evaluation criteria may be used instead of or in combination with cost-based real-time selection criteria.

In some embodiments, common storage location 130 may comprise a network storage location, such as a network drive, cloud storage location, or other location that may be accessed by each of client application 101 and network services 111, 112, 113. In some embodiments, transaction result information may be stored within workflow package 152, to potentially eliminate any need for storage/retrieval operations 161, 162, 163, and/or 164. Either or both of workflow package 152 and common storage location 130 may therefore be referred to herein as a "common storage location".

Transaction result information produced by network services 111, 112, and/or 113 may optionally be handled differently than log information. Transaction result information may comprise results of transactions performed in accordance with custom transaction instructions in workflow package 152. Log information may comprise for example logs of activities performed by a network service in the course of performing a transaction. While log information can be relevant for failure roll-back, troubleshooting and the like, end user 100 and client application 101 are typically interested in transaction results. In some embodiments, transaction result information may be stored in a common storage location, such as in common storage location 130 with storage/retrieval operations 162, 163, and/or 164, or in workflow package 152, while log information may be stored in a separate location which may or may not also comprise a common storage location. In some embodiments, transaction result information may be stored in workflow package 152 while log information may be stored in common storage location 130 with storage/retrieval operations 162, 163, and/or 164, for use in roll back and troubleshooting as necessary.

In some embodiments, workflow package 152 and/or transaction results produced by network services 111, 112, and 113 may be wholly or partially encrypted. Each network service may for example be configured to decrypt workflow package 152 upon receiving workflow package 152, and to encrypt workflow package 152 prior to sending workflow package 152 or workflow completion information 153 to a next network service or to client application 101 and/or client workflow manager 423. In some embodiments, each network service may be configured to encrypt transaction results for storage in common storage location 130. In some embodiments, encryption/decryption keys for encrypting/decrypting workflow package 152 and/or transaction results may be included in workflow package 152, along with encryption/decryption instructions.

In some embodiments, client application 101, client workflow manager 423 and/or network services 111, 112, and 113 may be configured to sign workflow package 152 using public/private key architectures, and/or to use any of a variety of authentication protocols to authenticate workflow package 152 upon receiving workflow package 152 from a previous network service or client application 101.

Figure 2:
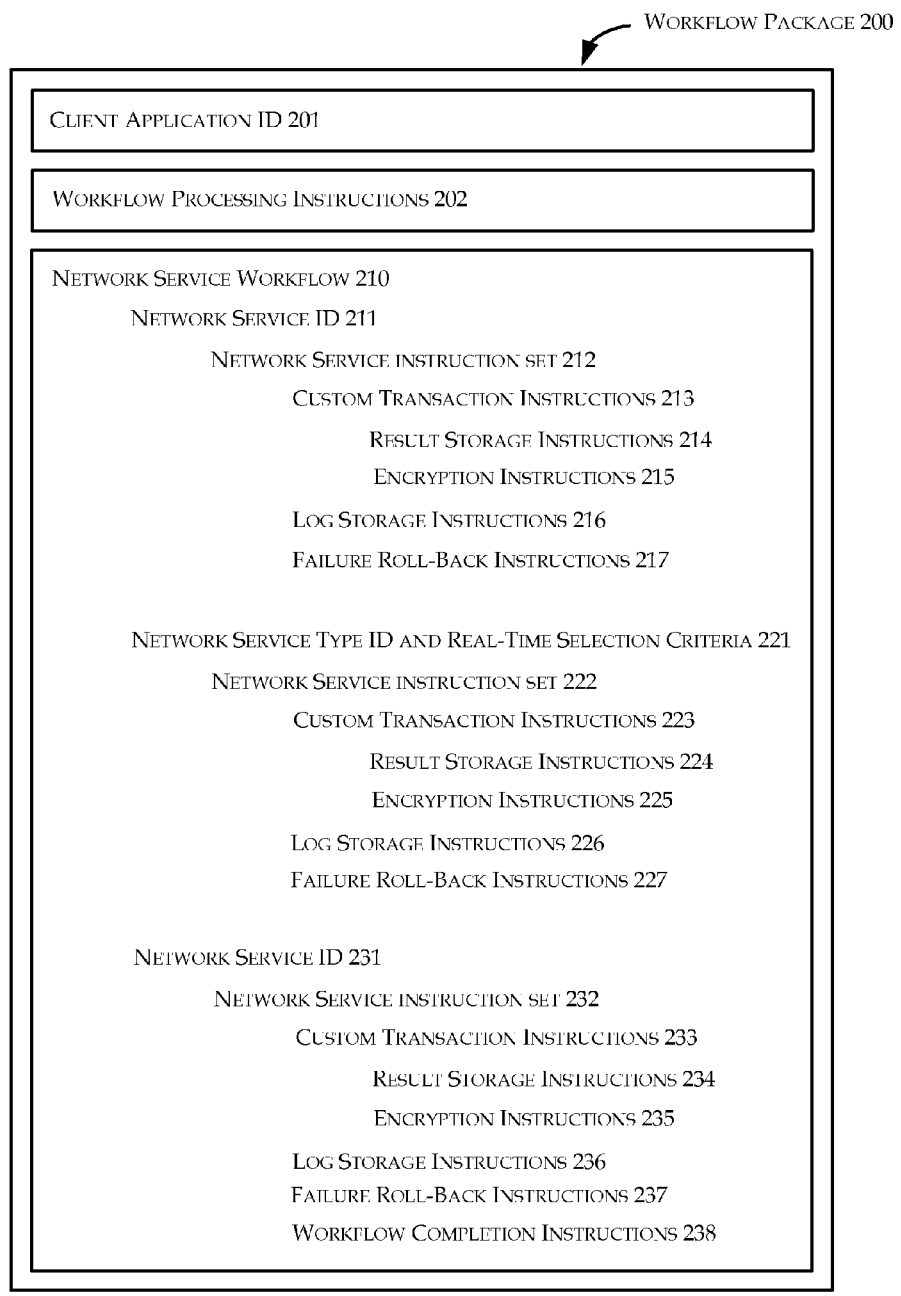
FIG. 2 is a diagram illustrating an example workflow package.

FIG. 2 is a diagram illustrating an example workflow package, arranged in accordance with at least some embodiments of the present disclosure. A workflow package 200 includes a client application ID 201, workflow processing instructions 202, and a network service workflow 210. Network service workflow 210 includes a network service ID 211, a network service ID and real-time selection criteria 221, and a network service ID 231, wherein network service IDs 211, 221, and 231 are arranged in a workflow sequence in which network service ID 211 is first, network service ID and real-time selection criteria 221 is second, and network service ID 231 is last. Three network service IDs are illustrated in FIG. 2 for simplicity of description, however it will be appreciated that more or fewer network service IDs may be involved in some embodiments.

Network service ID 211 is associated with a network service instruction set 212, comprising custom transaction instructions 213, log storage instructions 216, and failure roll-back instructions 217. Custom transaction instructions 213 include result storage instructions 214 and encryption instructions 215.

Network service ID and real-time selection criteria 221 is associated with a network service instruction set 222, comprising custom transaction instructions 223, log storage instructions 226, and failure roll-back instructions 227. Custom transaction instructions 223 include result storage instructions 224 and encryption instructions 225.

Network service ID 231 is associated with a network service instruction set 232, comprising custom transaction instructions 233, log storage instructions 236, failure roll-back instructions 237, and workflow completion instructions 238. Custom transaction instructions 233 include result storage instructions 234 and encryption instructions 235. Workflow completion instructions 238 may be configured to provide a notification or instruction configuring a network service identified by network service ID 231 to return workflow completion information to client application 101 and/or to client workflow manager 423, e.g., rather than attempting to identify a next network service within network service workflow 210. Workflow completion instructions 238 may reference or include client application ID 201, and the network service identified by network service ID 231 may be configured to use client application ID 201 to determine a destination for workflow completion information.

In some embodiments, workflow package 200 may comprise, for example, an Extensible Markup Language (XML) package. Any other markup language format as well as non-markup language formats may also be used as convenient to suit particular embodiments. It will be appreciated that a wide variety of layouts and structuring of workflow package contents are possible.

Workflow processing instructions 202 may comprise, for example, global instructions for use by network services in handling workflow package 200. Workflow processing instructions 202 may include, for example, instructions for network services to open network service workflow 210, extract an applicable network service instruction set, store transaction results, identify a next network service or return to a client application, send workflow package 200 to an identified next network service, and/or send workflow completion information to the client application. In some embodiments, network services configured for use according to this disclosure may each be configured with workflow processing instructions similar to workflow processing instructions 202, in which case workflow processing instructions 202 need not be included in workflow package 200.

Network service workflow 210 may comprise a plurality of network services, in the form of network service IDs 211, 221, 231, and workflow sequence information to engage the network services 211, 221, 231 according to a workflow sequence. For network service workflow 210, workflow sequence information is embodied by the order in which network service IDs 211, 221, 231 are included in network service workflow 210, that is, the structure of the data may imply the workflow sequence information.

When a next network service is specified as a URI or other unique identifier in workflow package 200, network services may be configured to reference the URI to identify the next network service, and to send workflow package 200 to the next network service at the designated URI. When the next network service is specified as a network service type and real time selection criteria, e.g., as with network service type ID and real time selection criteria 221, network services may be configured to identify the next network service by determining a plurality of network services according to the identified network service type, which network services may be referred to as network services X, Y, and Z, and selecting a next network service, e.g., network service X, from among the plurality of network services according to the real time selection criteria. For example, when network service type ID and real time selection criteria 221 indicates a lowest cost network service according to an identified network service type, network services may be configured to determine a lowest cost network service of the identified network service type from among the plurality of network services according to the identified network service type.

Instruction sets 212, 222, and 232, for network services 211, 221, and 231, respectively, may include custom transaction instructions 213, 223, and 233, respectively, which configure corresponding network services to perform custom transactions on behalf of the client application. Instruction sets 212, 222, and 232 may include, for example, self-contained encoded messages and/or URI along with custom transaction instructions. Network services 211, 221, and 231 may be configured to open the self-contained encoded messages and/or access URI to execute instruction sets 212, 222, and 232.

In some embodiments, custom transaction instructions 213, 223, and 233 may include result storage instructions 214, 224, and 234, respectively, and/or encryption instructions 215, 225, and 235, respectively, directing storage and encryption of transaction result information by each of network services 211, 221, and 231. Result storage instructions 214, 224, and 234 may for example direct storage in result storage locations comprising, e.g., common locations for use by network services 211, 221, and 231, such as network storage location(s) or location(s) within workflow package 200.

In some embodiments, network service instruction sets 212, 222, and 232, for network services 211, 221, and 231, respectively, may include log storage instructions 216, 226, and 236, respectively. Log storage instructions 216, 226, and 236 may direct storage of log information by each of the network services 211, 221, and 231. In some embodiments, log storage locations designated in log storage instructions 216, 226, and 236 may be similar for each of network services 211, 221, and 231, e.g., by designating a common storage location for log information produced by each of network services 211, 221, and 231.

In some embodiments, network service instruction sets 212, 222, and 232, for network services 211, 221, and 231, respectively, may include failure roll-back instructions 217, 227, and 237, respectively. Failure roll-back instructions may be activated when a network service fails to carry out network service instructions within an applicable network service instruction set, and optionally when a workflow failure notification is received from another network service in a workflow. In some embodiments, failure roll-back instructions 217, 227, and 237 may instruct corresponding network services to notify a previous network service in the workflow. For example, should the network service identified by network service ID 231 fail, the network service identified by network service ID 231 may be configured carry out failure roll-back instructions 237 to roll back a transaction performed according to custom transaction instructions 233, and to notify a network service from which the network service identified by network service ID 231 received workflow package 200, referred to herein as network service X, of the failure. Network service X may be configured to roll back a transaction performed according to custom transaction instructions 223, and to carry out failure roll-back instructions 227 to notify the network service identified by network service ID 211 of the failure. The network service identified by network service ID 211 may be configured to roll back a transaction performed according to custom transaction instructions 213, and to carry out failure roll-back instructions 217 to notify client application 101 and/or client workflow manager 423 of the failure. In some embodiments, any of failure roll-back instructions and/or 217, 227, and 237 may be configured to re-try identifying a next network service and sending workflow package 200, rather than rolling back. For example, failure roll-back instructions 217 may be configured to cause the network service identified by network service ID 211 to re-select a network service according to network service type ID and real-time selection criteria 221, and to send workflow package 200 to a newly selected network service.

Figure 3:
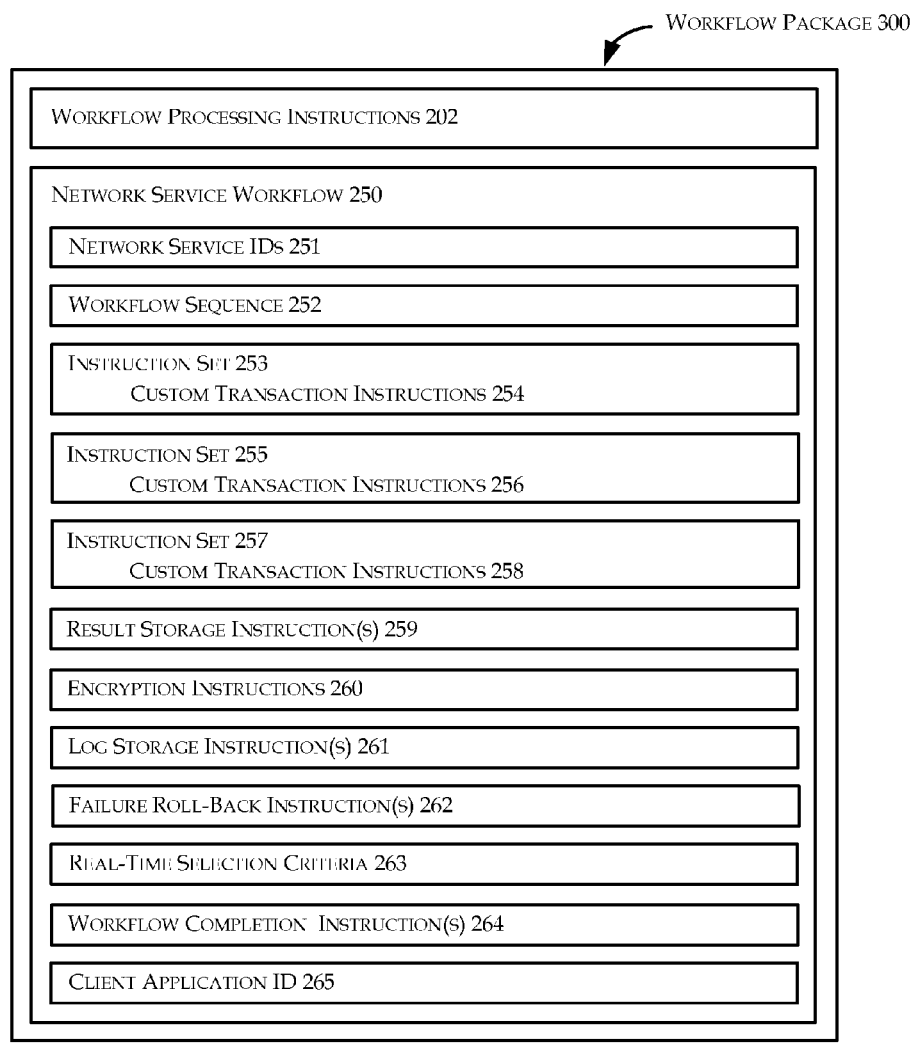
FIG. 3 is a diagram illustrating another example workflow package.

FIG. 3 is a diagram illustrating another example workflow package, arranged in accordance with at least some embodiments of the present disclosure. A workflow package 300 includes workflow processing instructions 202 and a network service workflow 250. Network service workflow 250 comprises network service IDs 251; a workflow sequence 252; an instruction set 253 comprising custom transaction instructions 254; an instruction set 255 comprising custom transaction instructions 256; an instruction set 257 comprising custom transaction instructions 258; result storage instruction(s) 259; encryption instructions 260; log storage instruction(s) 261; failure roll-back instructions 262; real-time selection criteria 263; workflow completion instructions 264; and client application ID 265. Three network service IDs are illustrated in FIG. 3 for simplicity of description, however it will be appreciated that more or fewer network service IDs may be involved in some embodiments.

Elements included in example workflow package 300 may be similar to those included in example workflow package 200. Network service workflow 250 may include a plurality of network services identified within network service IDs 251. Workflow sequence 252 may include workflow sequence information, for example, sequence identifiers corresponding to each of network service IDs 251, to engage network services identified by network service IDs 251 according to a workflow sequence. Instruction sets 253, 255, and 257 may include instructions for each of the network services in network service workflow 250. For example, each of instruction sets 253, 255, and 257 may include a network service identifier allowing instruction sets to be located and executed by an appropriate network service. Each instruction set 253, 255, and 257 may include custom transaction instructions 254, 256, and 258, respectively, configuring corresponding network services to perform custom transactions on behalf of client application 101.

In embodiments according to FIG. 3, network service workflow 250 may include common elements that may be processed by multiple network services. For example, each network service in network service workflow 250 may be configured to process common result storage instruction(s) 259; encryption instructions 260; log storage instruction(s) 261, and/or failure roll-back instructions 262. Any network service in network service workflow 250 that is configured to select a next network service using selection criteria may be configured to use real-time selection criteria 263. Any last network service in workflow sequence 252 may be configured to send workflow completion information according to workflow completion instructions 264, and to identify a destination for workflow completion information using client application ID 265.

Figure 4:
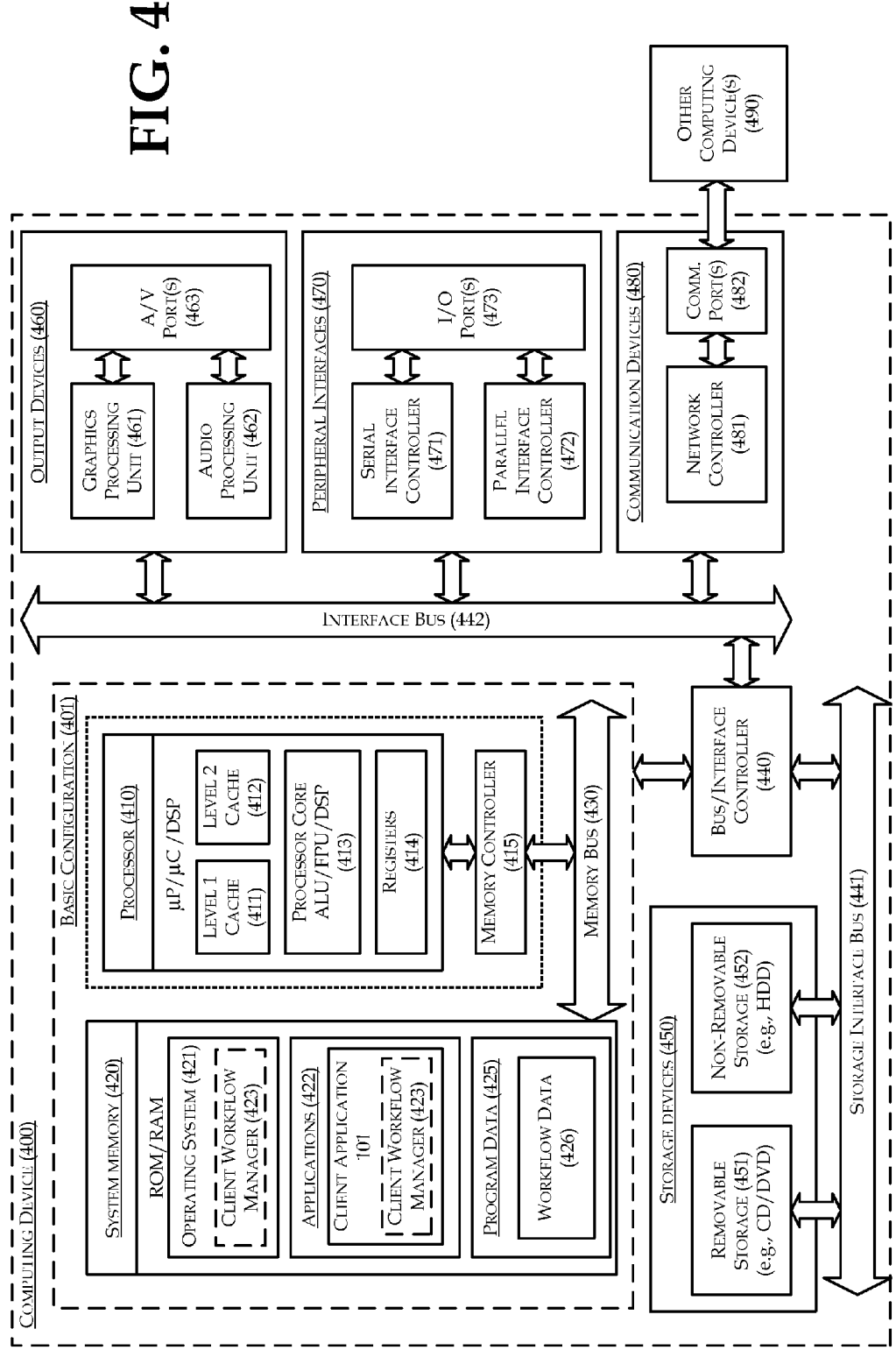
FIG. 4 is a block diagram of a computing device as one example of a client computing device.

FIG. 4 is a block diagram of a computing device as one example of a client computing device, arranged in accordance with at least some embodiments of the present disclosure. In a very basic configuration 401, computing device 400 may include one or more processors 410 and a system memory 420. A memory bus 430 may be used for communicating between processor 410 and system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. Processor core 413 may include an arithmetic logic unit (ALU), a floating point unit (FPU), a digital signal processing core (DSP Core), or any combination thereof. A memory controller 415 may also be used with processor 410, or in some implementations memory controller 415 may be an internal part of processor 410.

Depending on the desired configuration, system memory 420 may be of any type including but not limited to volatile memory (such as RAM), non-volatile memory (such as ROM, flash memory, etc.), or any combination thereof. System memory 420 typically includes an operating system 421, one or more applications 422, and program data 425. In some embodiments, operating system 421 may comprise a virtual machine that is managed by a Virtual Machine Manager (VMM). Applications 422 may include client application 101. Operating system 421 and/or client application 101 may include, for example, a client workflow manager 423, configured to generate workflow packages and carry out operations as necessary to initiate and manage workflows on behalf of client application 101 as discussed herein. Program data 425 may include workflow data 426 and any other data that may be used by client workflow manager 423.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 411, level 2 cache 412, system memory 420, removable storage devices 451, and non-removable storage devices 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. An example communications device 480 includes a network controller 481, which may be arranged to facilitate communications with one or more other computing devices 490, namely, any computing devices providing network services 111, 112, and 113, and common storage location 130, via one or more communication ports 482.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

In some embodiments, computing device 400 may also be implemented as a business or personal use computer including both laptop computer and non-laptop computer configurations. Computing device 400 may also be implemented as a server, e.g., when client application 101 provides a network service. In some embodiments, computing device 400 may comprise mobile device such as a smart phone or tablet computing device, or virtually any other device including for example a television set, a DVD player, an eBook reader, and a gaming console.

Figure 5:
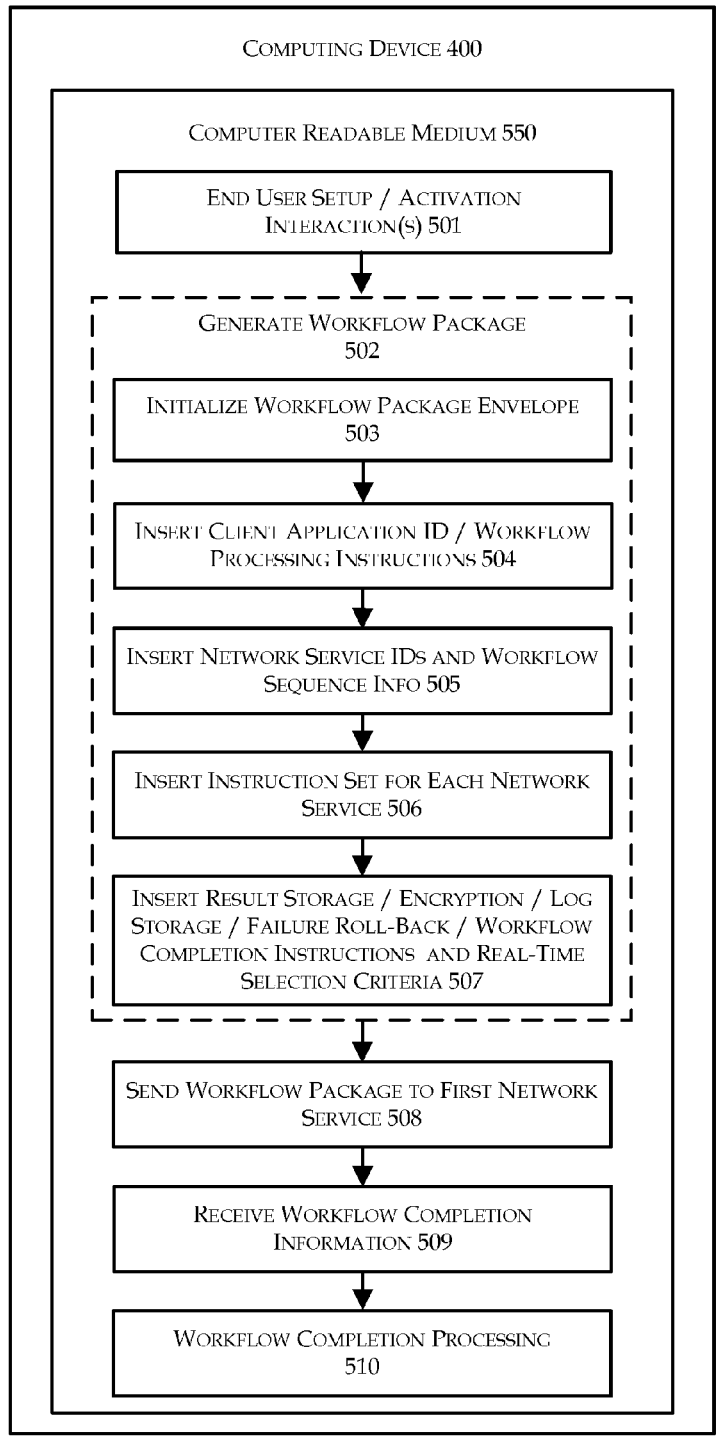
FIG. 5 is a flow diagram illustrating an example method for accessing network services by a client application executing on a computing device coupled to a network.

FIG. 5 is a flow diagram illustrating an example method for accessing network services by a client application executing on a computing device coupled to a network, arranged in accordance with at least some embodiments of the present disclosure. The example flow diagram may include one or more operations/modules as illustrated by blocks 501-510, which represent operations as may be performed in a method, functional modules in a computing device 400 equipped with client application 101 and client workflow manager 423 such as illustrated in FIG. 4, and/or instructions as may be recorded on a computer readable medium 550.

In FIG. 5, blocks 501-510 are illustrated as including blocks being performed sequentially, e.g., with block 501 first and block 510 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which client application 101 and client workflow manager 423 in computing device 400 may implement a network service workflow comprising a sequence of network services. In general, client application 101 may receive workflow configuration data pursuant to end user interactions, and client application 101 may cause client workflow manager 423 to generate a workflow package according to received workflow configuration data. Client workflow manager 423 may initiate the network service workflow by sending the workflow package to a first network service in the sequence. The network services may proceed to process the network service workflow without further interaction between client workflow manager 423 and the first network service or intermediate network services in the network service workflow. Client workflow manager 423 may receive workflow completion information upon completion of network services in the network service workflow. Finally, client workflow manager 423 may perform workflow completion processing, for example gathering workflow transaction results, performing subsequent interactions with client application 101 and/or end user 100, and storing workflow completion information.

At an "End User Setup/Activation Interaction(s)" block 501, client application 101 may for example interact with one or more end users 100 via one or more User Interfaces (UIs). Example interactions are discussed for example in connection with setup/activation 151 in FIG. 1. Example UIs may provide fields and controls allowing end user 100 to provide workflow configuration data to client application 101. For example, in the eBook translation example introduced herein, a UI may provide fields and/or controls configured to receive an item (eBook) selection, service and service preference selections, e.g., a language to translate the eBook into and eBook format preferences, network service provider selections, real-time selection criteria selections, and/or enter payment information and delivery preference selections.

It will be appreciated that network services can provide virtually any services; possible workflow configuration data consumed by network services may include virtually any workflow configuration data; and UI configurations that may be deployed for end user interactions are subject to a wide variety of design and functional considerations. The present disclosure is therefore not limited to any specific UI or workflow configuration data that may be received by client application 101 pursuant to block 501. In response to receiving an activation command from end user 100, client application 101 may activate client workflow manager 423 to generate the workflow package including received workflow configuration data. Block 501 may be followed by block 502.

At a "Generate Workflow Package" block 502, client workflow manager 423 may generate the workflow package. Client workflow manager 423 may generally initialize a workflow package envelope and insert, into the workflow package envelope, workflow configuration data received in block 501 and/or workflow configuration data calculated based on input received in block 501. Block 502 may include blocks 503-507.

At an "Initialize Workflow Package Envelope" block 503, client workflow manager 423 may create the workflow package envelope, such as a file or other data structure in a memory accessible by computing device 400. In some embodiments, any metadata that is generic to some or all workflow packages and/or data that is applicable to the workflow package as a whole may be automatically included in the workflow package envelope. For example, in some embodiments, a client application ID such as 201 or 265, workflow processing instructions such as 202, a network service workflow data structure such as 210 or 250, a transaction result storage data structure such as a table other data structure, and optionally any result storage/encryption/log storage/failure roll-back/ workflow completion instructions such as 259, 260, 261, 262, and 264, and real-time selection criteria such as 263 applicable to network services within the network service workflow may be inserted in block 503. Any workflow instructions that are unique to specific network services to be included in the workflow package may be inserted in connection with block 506. Block 503 may be followed by block 504.

At an "Insert Client Application ID/Workflow Processing Instructions" block 504, client workflow manager 423 may insert a client application ID and/or workflow processing instructions into the workflow package, if not done as part of block 503. For example, in some embodiments, client workflow manager 423 may be configured within operating system 421 in FIG. 4. Client workflow manager 423 may be accessed by multiple different client applications. Client workflow manager 423 may determine an appropriate client application ID for insertion in the workflow package by using a client application ID for a client application that requested generation of a workflow package. Similarly, client workflow manager 423 may determine workflow processing instructions from a variety of available workflow processing instructions, depending on the client application and/or the bundle of network services to be included in the workflow package. Block 504 may be followed by block 505.

At an "Insert Network Service IDs and Workflow Sequence Info" block 505, client workflow manager 423 may insert network service IDs into a network service workflow data structure such as 210 or 250 within the workflow package. Network services in the network service workflow may be specified using URI, or any other identifiers. Network services in the network service workflow may also be specified according to network service type and real-time selection criteria, e.g., by including identified network service type and selection criteria real-time such as lowest cost.

Network service IDs may comprise network service IDs for some or all network services involved in completing operations pursuant to end user setup interactions in block 501. For example, network service IDs may comprise a bundle of related network services, such as a payment service and a shipping service, a video transcoding service and a storage service, or a data collection service and a visual reporting service. Such bundles of related network services may supply network services specified in block 501, or alternatively, some network services may be carried out within a network service workflow while other network services may be separately accessed, e.g., by client application 101, outside the network service workflow, or via a separate network service workflow. In some embodiments, client workflow manager 423 may be configured to generate multiple workflow packages and initiate multiple network service workflows to deploy network services on behalf of client application 101.

Workflow sequence information may engage network services according to a workflow sequence. Workflow sequence information may comprise, for example, sequence identifiers for network service IDs included in the workflow package. Client workflow manager 423 may be configured to send the workflow package to a first network service in the sequence, and each network service may be configured to send the workflow package to a next network service in the sequence, or else to return workflow completion information to client workflow manager 423.

In some embodiments, workflow sequence information may be pre-determined for certain bundles of network services, and client workflow manager 423 may insert pre-determined workflow sequence information. Alternatively, client workflow manager 423 may assign workflow sequence information according to dependencies of network services included in the workflow package. For example, when a second network service is dependent on an output generated by a first network service, client workflow manager 423 may insert workflow sequence information that sequences the first network service prior to the second network service. Other approaches for calculating network sequence information for insertion in a workflow package according to block 505 may also be used. In some embodiments, sequence information may be assigned randomly. In some embodiments, sequence information may be assigned by end user 100 in block 501. In some embodiments, more error-prone network services may be sequenced prior to less error-prone network services to reduce complexity in event of a failure roll-back, or vice-versa to allow for partial roll-back and re-trying more error-prone network services. Block 505 may be followed by block 506.

At an "Insert Instruction Set for Each Network Service" block 506, client workflow manager 423 may insert instruction sets for each of the network services in the workflow package, each instruction set including instructions configuring a corresponding network service to perform a custom transaction on behalf of the client application 101. In some embodiments, instruction sets for one or more of the network services may include self-contained encoded messages and/or URI along with instructions. URI may for example direct network services to resources involved in carrying out instruction sets, while accompanying instructions direct processing of resources available at the URI.

Instruction sets may be generated by client application 101 according to workflow configuration data received in block 501. For example, an instruction set for a payment service may include end user credit card information received in block 501, along with an explicit or implicit instruction to process a payment. A payment service may perform a custom transaction by processing the payment using the end user credit card information inserted into the workflow package. Similarly, instruction sets for any network services included in the workflow package may comprise workflow configuration data received in block 501 and/or workflow configuration data calculated based on end user information, selections and instructions received in block 501, as well as explicit or implicit instructions to carry out a transaction using the workflow configuration data.

In some embodiments, instruction sets for network services in the network service workflow may include result storage/encryption/log storage/failure roll-back/workflow completion instructions and/or real-time selection criteria within each instruction set, e.g., as illustrated in FIG. 2. In some embodiments, instruction sets may reference shared result storage/encryption/log storage/failure roll-back/workflow completion instructions and/or real-time selection criteria, e.g., as illustrated in FIG. 3. Block 506 may be followed by block 507.

At an "Insert Result Storage/Encryption/Log Storage/Failure Roll-Back/Workflow Completion Instructions and Real-Time Selection Criteria" block 507, client workflow manager 423 may insert into the workflow package any shared result storage/encryption/log storage/failure roll-back/workflow completion instructions such as 259, 260, 261, 262, and 264, and real-time selection criteria such as 263 applicable to network services within the network workflow, when not done as part of block 503. Any workflow instructions that are unique to specific network services to be included in the workflow package may be inserted in connection with block 506.

In some embodiments, result storage instructions directing storage of transaction result information by each of the network services may direct storage to a common location for use by the network services. Such a common location may include, for example, a network storage location or a location within the workflow package. In some embodiments, log storage location(s) may direct storage of log information by each of the network services. Block 502, comprising blocks 503-507, may be followed by block 508.

Blocks 508-509 may be performed by client application 101, operating system 421 and/or client workflow manager 423. For simplicity of explanation, blocks 508-509 are discussed herein as performed by client workflow manager 423; however this disclosure is not limited to embodiments in which client workflow manager 423 performs blocks 508-509.

At a "Send Workflow Package to First Network Service" block 508, client workflow manager 423 may send the workflow package to a first network service in the network service workflow, i.e., to the first network service specified in workflow sequence information within the workflow package. Client workflow manager 423 may for example read a network service ID for the first network service in the network service workflow, determine a destination address from the network service ID or otherwise look up a destination address for the first network service, and send the workflow package to the destination address for the first network service.

In some embodiments, client workflow manager 423 may perform encryption/authentication of the workflow package prior to sending it to the first network service. For example, client workflow manager 423 may digitally sign the workflow package so that recipient network services may authenticate client workflow manager 423, client application 101, computing device 400, and/or end user 100 as an originator of the workflow package. Client workflow manager 423 may engage an encryption algorithm to encrypt the workflow package. After sending the workflow package to the first network service in the network service workflow, in some embodiments, the network services may proceed to process the network service workflow without further interaction between client workflow manager 423 and the first network service or intermediate network services in the network service workflow. When the last network service in the network service workflow executes, a further interaction between client workflow manager 423 and the last network service may take place, for example in the form of the last network service passing workflow completion information to the client workflow manager 423 through a callback function. In some embodiments, client workflow manager 423 may allow completion of the first network service in the network service workflow and any intermediate network services in the network service workflow without further interaction between client workflow manager 423 and the first network service or the intermediate network services. Allowing completion of network services may reduce network traffic between client workflow manager 423 and network services, as network services may communicate the workflow package to next network services without communications between client workflow manager 423 and the network services, until the last network service in the network service workflow returns workflow completion information to client workflow manager 423.

In some embodiments, client workflow manager 423 may idle or "spin" during operations of network services pursuant to the workflow, while maintaining state information relating to the network service workflow in an active memory of computing device 400. In some embodiments, client workflow manager 423 may write state information to disk and shut down, and then subsequently re-start in response to receiving workflow completion information at computing device 400.

In some embodiments, client workflow manager 423 may be configured to allow completion of network services for a predetermined period of time. If client workflow manager 423 does not receive workflow completion information within the predetermined period of time, client workflow manager 423 may check for errors, e.g., by communications with some or all network services and/or common storage location 130 in the network service workflow. Client workflow manager 423 may report errors and/or received workflow failure information to end user 100. In some embodiments, client workflow manager 423 may automatically prompt end user 100 to re-activate the network service workflow, optionally providing fields and/or controls for end user 100 update or correction of workflow configuration data. In some embodiments, client workflow manager 423 may be configured to automatically re-activate the network service workflow without further end user input. Block 508 may be followed by block 509.

At a "Receive Workflow Completion Information" block 509, client workflow manager 423 may receive workflow completion information from a last network service in the network service workflow without further interaction between client workflow manager 423 and the first network service or intermediate network services in the network service workflow—that is, without interaction between client workflow manager 423 and the first network service or intermediate network services in the network service workflow between sending the workflow package to the first network service in block 508 and receiving workflow completion information in block 509. In some embodiments, client workflow manager 423 may perform decryption/authentication of received workflow completion information. For example, client workflow manager 423 may engage an authentication protocol to ensure that received workflow completion information comes from a last network service in the network service workflow and/or to ensure that any transaction results included in received workflow completion information are in fact produced by network services in the network service workflow. Client workflow manager 423 may engage a decryption algorithm to decrypt received workflow completion information.

In some embodiments workflow completion information may comprise a notification that the network service workflow is complete. In some embodiments workflow completion information may comprise transaction result information from some or all network services in the network service workflow. In some embodiments workflow completion information may comprise a common storage location address from which transaction result information can be retrieved. In some embodiments workflow completion information may comprise the workflow package, wherein the workflow package is modified to include workflow completion information. It will be appreciated that workflow completion information may be configured in a variety of ways, and any information, notification, or other communication that indicates workflow completion may be used as appropriate for particular implementations. Block 509 may be followed by block 510.

At a "Workflow Completion Processing" block 510, client workflow manager 423 may for example store workflow completion information, notify end user 100 of workflow completion, and/or automatically retrieve transaction results from common storage location 130. Client workflow manager 423 may also notify client application 101 of workflow completion so that client application 101 may proceed with further end user interactions or other client application 101 operations.

Figure 6:
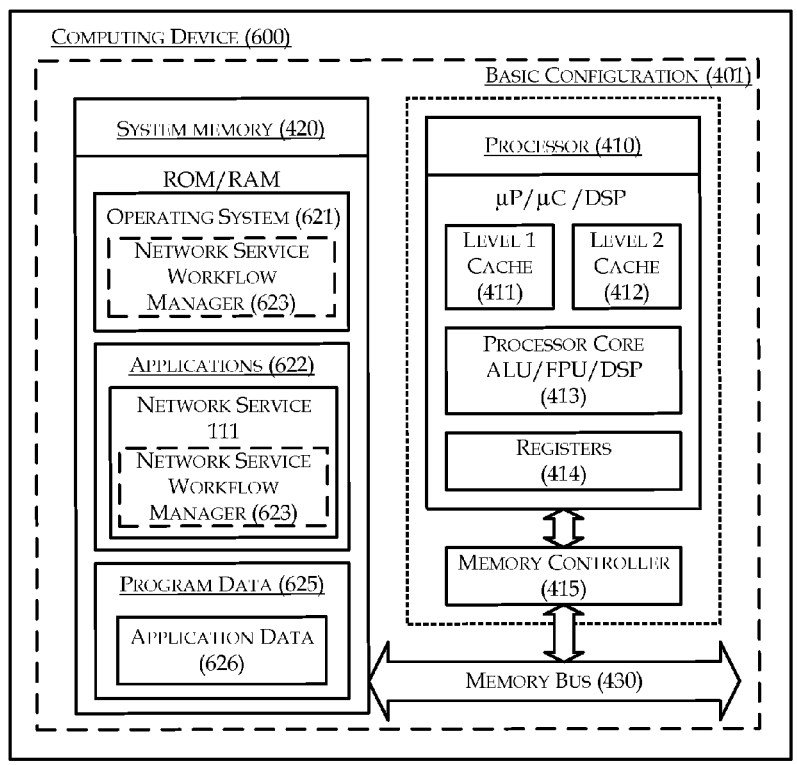
FIG. 6 is a block diagram of a computing device as one example of a network service computing device.

FIG. 6 is a block diagram of a computing device as one example of a network service computing device, arranged in accordance with at least some embodiments of the present disclosure. Devices according to FIG. 6 may generally comprise similar hardware and software to that introduced in connection with FIG. 4, and so aspects of FIG. 4 are omitted from FIG. 6 to avoid redundancy of description. Similar to FIG. 4, in a basic configuration 401, computing device 600 may include one or more processors 410 and a system memory 420. A memory bus 430 may be used for communicating between processor 410 and system memory 420. Elements of processor 410 and system memory 420 and system memory are introduced in FIG. 4, where like elements are assigned like identifiers.

In network service computing devices according to FIG. 6, system memory 420 may include an operating system 621, one or more applications 622, and program data 625. Applications 622 may include network service 111 as an example network service. Operating system 621 and/or network service 111 may include, for example, a network service workflow manager 623, configured to process network service workflows for example by receiving workflow packages, processing instruction sets within received workflow packages, storing transaction results and sending workflow packages to a next network service or returning workflow completion data to client application 101 or client workflow manager 423 as discussed herein. Program data 625 may include application data 626 and any other data that may be used by network service workflow manager 623. Devices according to FIG. 6 may provide any network service, e.g., any of network services 111, 112, or 113, and accordingly, any network service may be configured to include network service workflow manager 623 or to access network service workflow manager 623 in operating system 621.

In some embodiments, computing device 600 may be implemented as a server, e.g., a server managed by a network service provider and coupled to a network to provide a network service pursuant to incoming electronic service requests. Computing device 600 may also comprise one or more professionally managed devices within a data center.

Figure 7:
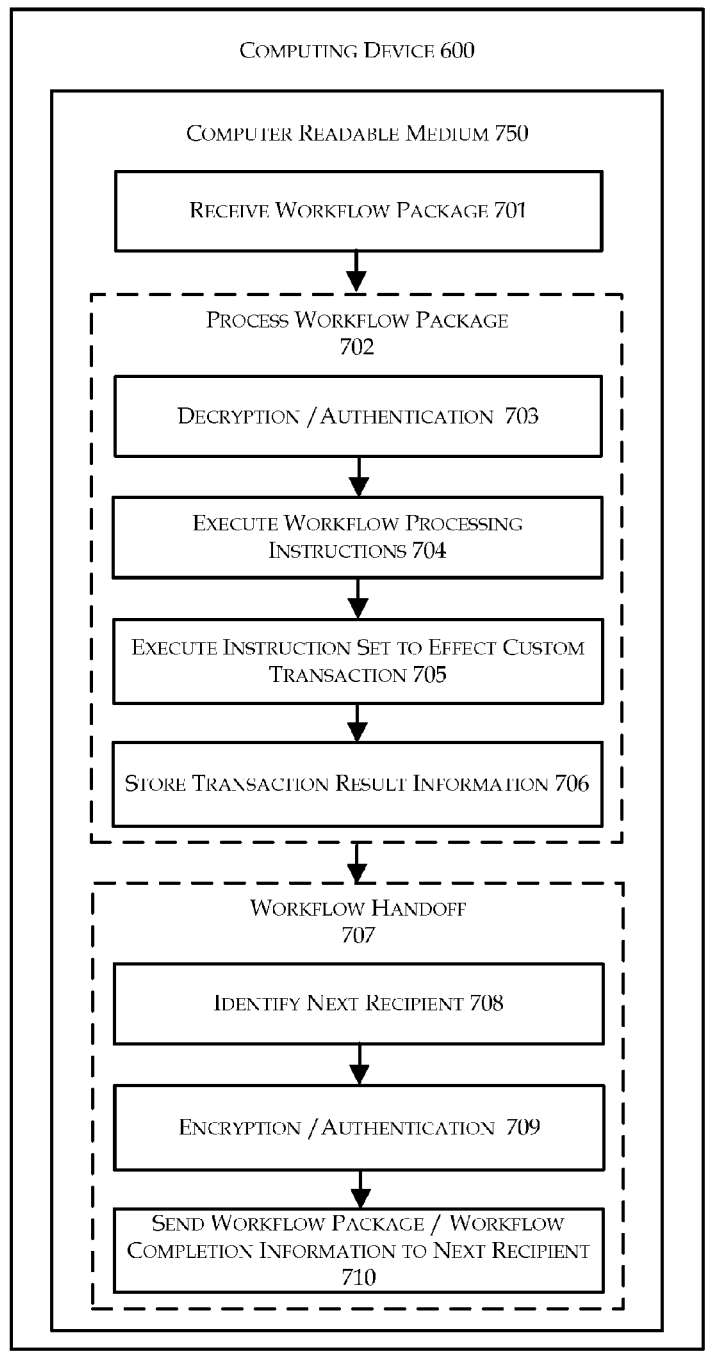
FIG. 7 is a flow diagram illustrating an example method for processing a network service workflow by a network service coupled to a network.

FIG. 7 is a flow diagram illustrating an example method for processing a network service workflow by a network service coupled to a network, arranged in accordance with at least some embodiments of the present disclosure. The example flow diagram may include one or more operations/modules as illustrated by blocks 701-710, which represent operations as may be performed in a method, functional modules in a computing device 600 equipped with client network service workflow manager 623 such as illustrated in FIG. 6, and/or instructions as may be recorded on a computer readable medium 750.

In FIG. 7, blocks 701-710 are illustrated as including blocks being performed sequentially, e.g., with block 701 first and block 710 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates an example method by which a network service such as any of network services 111, 112, and 113, configured with network service workflow manager 623 as illustrated in FIG. 6, may process a network service workflow. Network service 111 is used as an example network service in the below description of FIG. 7, however it will be appreciated that this description applies generally to operations of any network service in a network service workflow. In general, network service 111 may receive a workflow package, decrypt/authenticate the workflow package, process an instruction set within the workflow package to effect a custom transaction, store transaction results, identify a next recipient such as a next network service or return to client application 101, encrypt/authenticate the workflow package, and/or send the workflow package or workflow completion information to the next recipient.

At a "Receive Workflow Package" block 701, network service 111 may receive the workflow package. The workflow package may be received from client application 101 or a previous network service. The workflow package may be digitally signed and/or encrypted, and may include, inter alia, an identification of client application 101, a network service workflow data structure such as network service workflow 210 or network service workflow 250, comprising a plurality of network services and workflow sequence information to engage the network services according to a workflow sequence, instruction sets for each of the network services in the network service workflow, each instruction set including instructions configuring a corresponding network service to perform a custom transaction on behalf of client application 101, log storage locations directing storage of log information by each of the network services, and/or result storage instructions directing storage of transaction result information by each of the network services. Block 701 may be followed by block 702.

At a "Process Workflow Package" block 702, network service 111 may generally perform operations to open the workflow package and execute instructions therein for network service 111. Block 702 may include blocks 703-706.

At a "Decryption/Authentication" block 703, network service 111 may perform decryption/authentication of the workflow package. For example, network service 111 may engage an authentication protocol to ensure that the received workflow package comes from client application 101 or a previous network service in the network service workflow. Network service 111 may engage a decryption algorithm to decrypt the workflow package. Block 703 may be followed by block 704.

At an "Execute Workflow Processing Instructions" block 704, network service 111 may execute workflow processing instructions for example to access an instruction set for network service 111 in the workflow package, and/or to perform other actions pursuant to processing the workflow package. In some embodiments, the workflow processing instructions may be included in the workflow package, e.g., as workflow processing instructions 202, illustrated in FIG. 2 and FIG. 3. In some embodiments, network services may have native workflow processing instructions which may be executed when workflow packages are received. Block 704 may be followed by block 705.

At an "Execute Instruction Set to Effect Custom Transaction" block 705, network service 111 may extract from the workflow package, load, and execute an instruction set from among the instruction sets in the workflow package, to effect a custom transaction on behalf of client application 101. For example, when an instruction set for network service 111 is included in a self-contained encoded message and/or a URI along with instructions, network service 111 may open the self-contained encoded message and/or access the URI to execute the instruction set.

Network service 111 may identify its instruction set within the workflow package for example by referring to an instruction set sequence number, a network service name, type identifier, or other identifier. Network service 111 may effect a custom transaction on behalf of client application 101 by performing a service according to any workflow configuration data included in the workflow package. For example, a custom payment transaction may be effected by using payment information included in the workflow package, or any other service may be carried out as specified in the workflow package. Block 705 may be followed by block 706.

At a "Store Transaction Result Information" block 706, network service 111 may store transaction result information in a storage location according to result storage instructions in the workflow package. As noted herein, the result storage location may comprise a location within the workflow package or for example one or more additional result files that may be packaged alongside the workflow package, such as in a same .ZIP file or other multi-file package. In some embodiments, the result storage location may comprise common storage location 130, implemented as a network drive or other storage accessible to a plurality of network services. In some embodiments, network service 111 may digitally sign and/or encrypt transaction result information prior to storage. In some embodiments, network service 111 may store log information according to instructions in the workflow package. When the workflow package comprises log storage locations directing storage of log information by network service 111, network service 111 may store log information in a storage location from among the one or more log storage locations in the workflow package, namely, in a storage location designated for use by network service 111. Block 702, including blocks 703-706 may be followed by block 707.

At a "Workflow Handoff" block 707, network service 111 may generally determine a next recipient within the network service workflow, such as a next network service in the network service workflow, or a return to client application 101, and take any steps to communicate workflow information, such as the workflow package or workflow completion information, to the next recipient. Block 707 may include blocks 708-710.

At an "Identify Next Recipient" block 708, network service 111 may identify a next network service in the network service workflow, or a return to client application 101. Network service 111 may for example check a workflow sequence number for itself (in this example, network service 111) in the workflow package, and then identify the next network service in the network service workflow by identifying a network service with a next sequence number. When no next network service exists in the workflow package, network service 111 may identify a return to client application 101, either explicitly based on data included in the workflow sequence information, or implicitly based on the lack of any next network service in the workflow sequence information. When the next network service is identified as a URI within the workflow package, identifying the next network service in the network service workflow may comprise referencing the URI in the workflow package that identifies the next network service.

In some embodiments, the next network service in the network service workflow may be specified as an identified network service type along with real-time selection criteria. Network service 111 may identify the next network service in the network service workflow by determining a network service of the identified network service type according to the real-time selection criteria, from among a plurality of network services according to the identified network service type. For example, an identified network service type may comprise a translation service, and real-time selection criteria may comprise a lowest cost. Network service 111 may determine available translation services, e.g., using an additional network service or other service-provider identification technology, and network service 111 may compare costs of the available services according the real-time selection criteria, and network service 111 may select a lowest cost translation service. Block 708 may be followed by block 709.

At an "Encryption/Authentication" block 709, network service 111 may perform encryption/authentication of the workflow package and/or workflow completion information prior to sending it to the next network service or client application 101. For example, network service 111 may digitally sign the workflow package so that recipient network services may authenticate network service 111, computing device 600, and/or network service workflow manager 623 as an originator of the workflow package. Network service 111 may engage an encryption algorithm to encrypt the workflow package. Block 709 may be followed by block 710.

At a "Send Workflow Package/Workflow Completion Information to Next Recipient" block 710, when a next network service is identified in the network service workflow in block 708, network service 111 may send the workflow package to the next network service in the network service workflow without interaction between client application 101 and network service 111. When a next network service is not identified in the network service workflow, network service 111 may send workflow completion information to client application 101.

Figure 8:
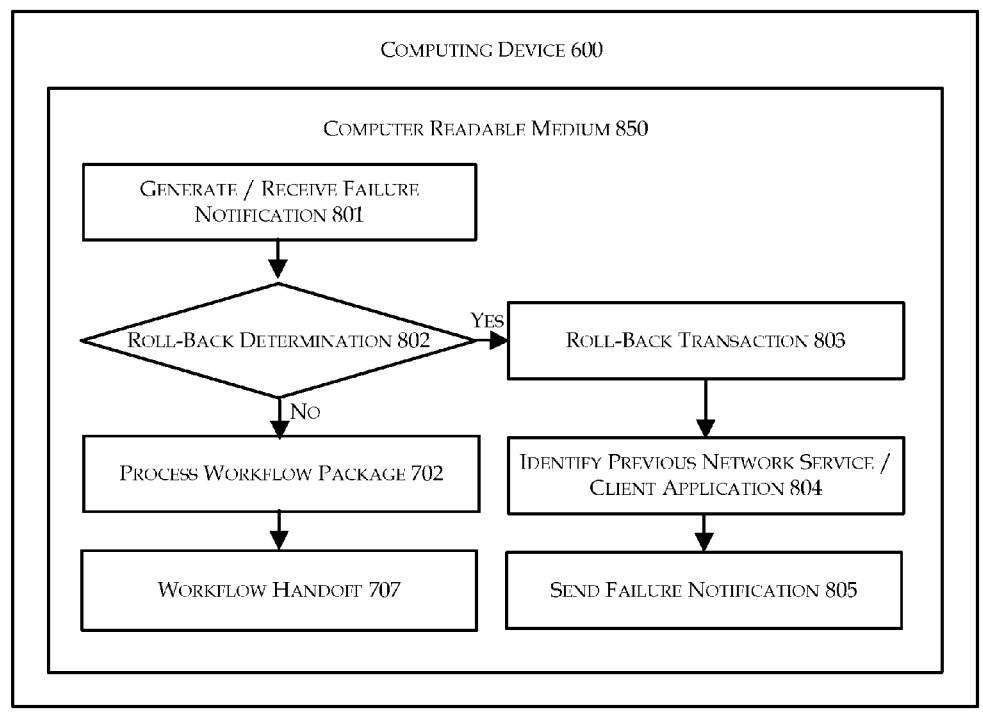
FIG. 8 is a flow diagram illustrating an example method for a roll-back of a network service workflow by a network service coupled to a network, all arranged in accordance with at least some embodiments of the present disclosure.

FIG. 8 is a flow diagram illustrating an example method for a roll-back of a network service workflow by a network service coupled to a network, arranged in accordance with at least some embodiments of the present disclosure. The example flow diagram may include one or more operations/modules as illustrated by blocks 801-805 and 702 and 707, which represent operations as may be performed in a method, functional modules in a computing device 600 equipped with client network service workflow manager 623 such as illustrated in FIG. 6, and/or instructions as may be recorded on a computer readable medium 850.

In FIG. 8, blocks 801-805, 702, and 707 are illustrated as including blocks being performed sequentially, e.g., with block 801 first and either block 805 or block 707 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 8 illustrates an example method by which a network service such as any of network services 111, 112, and 113, configured with network service workflow manager 623 as illustrated in FIG. 6, may roll-back a network service workflow in the event of a network service failure. Network service 111 is used as an example network service in the below description of FIG. 8, however it will be appreciated that this description applies generally to operations of any network service in a network service workflow. In general, network service 111 may generate or receive a failure notification, and either roll-back a transaction and send a failure notification to a previous network service in the network service workflow or to client application 101, or attempt to re-try, e.g., by optionally processing the workflow package and/or proceeding with workflow handoff as described in connection with FIG. 7.

At a "Generate/Receive Failure Notification" block 801, network service 111 may generate a failure notification in response to a failure to execute a transaction by network service 111. Alternatively, network service 111 may receive a failure notification relating to the workflow package, e.g., from a next network service in the network service workflow. Block 801 may be followed by decision block 802.

At a "Roll-Back Determination" decision block 802, network service 111 may determine whether a roll-back is to be performed in view of the failure notification generated/received in block 801. If a roll-back is to be performed, methods according to FIG. 8 may proceed to block 803, "Roll-Back Transaction" and/or block 804, "Identify Previous Network Service/Client Application". If a roll-back is not to be performed, methods according to FIG. 8 may proceed to block 702, "Process Workflow Package" and/or block 707, "Workflow Handoff."

In some embodiments, network service 111 may roll-back in response to any failure notification in block 801. In some embodiments, network service 111 may roll-back in response to some failure notification conditions, and network service 111 may attempt to re-try to the network service workflow in response to other failure notification conditions. For example, when network service 111 receives a failure notification from a network service that was selected by network service type and real-time selection criteria, network service 111 may determine not to roll-back, but rather to proceed to block 707 to re-select another acceptable network service. When network service 111 generates a failure notification due to failure of network service 111 in processing a transaction, network service 111 may determine to proceed with a roll-back via block 803. Any number of other scenarios or conditions may be deemed appropriate for determining to re-try a network service workflow, or to proceed with a roll-back. In some embodiments, decision block 802 may be followed by blocks 803, 804, 702, or 707.

At a "Process Workflow Package" block 702, and at a "Workflow Handoff" block 707, in response to a determination to not roll-back the network service workflow, network service 111 may perform blocks 702 or 707 as described in connection with FIG. 7. Blocks 702 and 707 may be performed when network service 111 failed to execute a transaction, while block 707 may be performed (without re-trying block 702) when network service 111 did not fail however network service 111 received a failure notification from a next network service in the network service workflow.

At a "Roll-Back Transaction" block 803, network service 111 may roll-back its own transaction carried out pursuant to execution of its instruction set in the workflow package. Block 803 may be followed by block 804.

At an "Identify Previous Network Service/Client Application" block 804, network service 111 may identify a previous network service, or a return to client application 101 for example by reference to workflow sequence information in the workflow package. Block 804 may be followed by block 805.

At a "Send Failure Notification" block 805, network service 111 may send a failure notification to the previous network service or to client application 101 identified in block 804. The failure notification may include information including, for example, which network service in the workflow failed, and any failure information provided by the failed network service.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to process a decentralized network service workflow by a network service among a plurality of different network services in the workflow, the method comprising:
    receiving, by the network service among the plurality of different network services in the workflow, a workflow package, wherein the workflow package includes:
        an identification of a client application;
        identifications of the plurality of different network services in the workflow;
        workflow sequence information to engage the plurality of different network services according to a workflow sequence; and
        instruction sets for each of the plurality of different network services in the workflow, each instruction set including instructions configuring a corresponding network service to perform a respective custom transaction on behalf of the client application;
    wherein the plurality of different network services in the workflow comprise network services provided by a plurality of different providers, wherein network services in the workflow each execute on a respective server adapted to communicate with other network services via a respective remote network connection, and wherein network services in the workflow sequentially process the workflow package by receiving the workflow package, performing a respective custom transaction on behalf of the client application identified in the workflow package, and either sending the workflow package to a next network service in the workflow according to workflow sequence information included in the workflow package, or sending workflow completion information to the client application; and
    processing the workflow package by the network service, comprising:
        executing, by the network service, an instruction set from among the instruction sets in the workflow package to effect a respective custom transaction on behalf of the client application;
        identifying, by the network service, either the next network service in the workflow or a return to the client application, wherein the next network service in the workflow is identified from among the plurality of different network services identified in the workflow package according to the workflow sequence information in the workflow package, and wherein the network service and the next network service are provided by different providers among the plurality of different providers;
        when the next network service is identified in the workflow, sending, by the network service, the workflow package to the next network service provided by a different provider without interaction between the client application and the network service; and
        when a next network service is not identified in the network service workflow, sending, by the network service, workflow completion information to the client application.

2. The method of claim 1, wherein the workflow package comprises result storage instructions directing storage of transaction result information by each of the plurality of different network services to a common location, wherein the common location comprises a network storage location or a location within the workflow package, and further comprising storing, by the network service, transaction result information in the common location according to the result storage instructions in the workflow package.

3. The method of claim 1, wherein the workflow package comprises one or more log storage locations directing storage of log information by each of the plurality of different network services, and further comprising storing, by the network service, log information in a storage location from among the one or more log storage locations.

4. The method of claim 1, wherein identifying, by the network service, the next network service in the workflow comprises referencing a Uniform Resource Identifier (URI) in the workflow package that identifies the next network service.

5. The method of claim 1, wherein an identification, in the workflow package, of one or more of the plurality of different network services in the workflow comprises an identified network service type along with real-time selection criteria, and wherein identifying, by the network service, the next network service in the workflow comprises determining a network service of the identified network service type according to the real-time selection criteria, from among a plurality of network services of the identified network service type.

6. The method of claim 1, wherein the workflow package comprises an Extensible Markup Language (XML) package.

7. The method of claim 1, wherein one or more of the instruction sets in the workflow package comprises one or more of a self-contained encoded message or a Uniform Resource Identifier (URI) along with instructions, and further comprising opening, by the network service, the self-contained encoded message and/or accessing, by the network service, the URI to execute the instruction set from among the instruction sets in the workflow package.

8. The method of claim 2, further comprising encrypting, by the network service, transaction result information.

9. The method of claim 1, wherein the network service comprises a payment service, a shipping service, a video transcoding service, a storage service, a data collection service, or a visual reporting service.

10. The method of claim 1, further comprising:
receiving, by the network service, a failure notification indicating a failure to execute a transaction by another network service among the plurality of different network services in the workflow;
rolling back, by the network service, the respective custom transaction effected by the network service on behalf of the client application;
identifying, by the network service, either a previous network service in the workflow sequence or the client application; and
sending, by the network service, a failure notification to the previous network service in the workflow sequence or the client application.

11. A non-transitory computer readable storage medium having computer executable instructions executable by a processor in order to process a decentralized network service workflow by a network service among a plurality of different network services in the workflow, the instructions that, when executed by the processor, cause the processor to:
receive a workflow package, wherein the workflow package includes:
an identification of a client application;
identifications of the plurality of different network services in the workflow;
workflow sequence information to engage the plurality of different network services according to a workflow sequence; and
instruction sets for each of the plurality of different network services in the workflow, each instruction set including instructions configuring a corresponding network service to perform a respective custom transaction on behalf of the client application;
wherein the plurality of different network services in the workflow comprise network services provided by a plurality of different providers, wherein network services in the workflow each execute on a respective server adapted to communicate with other network services via a respective remote network connection, and wherein network services in the workflow sequentially process the workflow package by receiving the workflow package, performing a respective custom transaction on behalf of the client application identified in the workflow package, and either sending the workflow package to a next network service in the workflow according to workflow sequence information included in the workflow package, or sending workflow completion information to the client application; and
process the workflow package by the network service, comprising instructions that cause the processor to:
execute an instruction set from among the instruction sets in the workflow package to effect a respective custom transaction on behalf of the client application;
identify either the next network service in the workflow or a return to the client application, wherein the next network service in the workflow is identified from among the plurality of different network services identified in the workflow package according to the workflow sequence information in the workflow package, and wherein the network service and the next network service are provided by different providers among the plurality of different providers;
when the next network service is identified in the workflow, send the workflow package to the next network service provided by a different provider without interaction between the client application and the network service; and
when a next network service is not identified in the network service workflow, send workflow completion information to the client application.

12. The non-transitory computer readable storage medium of claim 11, wherein the workflow package comprises result storage instructions directing storage of transaction result information by each of the plurality of different network services to a common location, wherein the common location comprises a network storage location or a location within the workflow package, and further comprising instructions that cause the processor to store transaction result information in the common location according to the result storage instructions in the workflow package.

13. The non-transitory computer readable storage medium of claim 11, wherein the workflow package comprises one or more log storage locations directing storage of log information by each of the plurality of different network services, and further comprising instructions which cause the processor to store log information in a storage location from among the one or more log storage locations.

14. The non-transitory computer readable storage medium of claim 11, wherein identifying the next network service in the workflow comprises referencing a Uniform Resource Identifier (URI) in the workflow package that identifies the next network service.

15. The non-transitory computer readable storage medium of claim 11, wherein an identification, in the workflow package, of one or more of the plurality of different network services in the workflow comprises an identified network service type along with real-time selection criteria, and wherein identifying, by the network service, the next network service in the workflow comprises determining a network service of the identified network service type according to the real-time selection criteria, from among a plurality of network services of the identified network service type.

16. The non-transitory computer readable storage medium of claim 11, wherein the workflow package comprises an Extensible Markup Language (XML) package.

17. The non-transitory computer readable storage medium of claim 11, wherein one or more of the instruction sets in the workflow package comprises one or more of a self-contained encoded message or a Uniform Resource Identifier (URI) along with instructions, and further comprising instructions which cause the processor to open the self-contained encoded message and/or access the URI to execute the instruction set from among the instruction sets in the workflow package.

18. The non-transitory computer readable storage medium of claim 12, further comprising instructions which cause the processor to encrypt transaction result information.

19. The non-transitory computer readable storage medium of claim 11, wherein the network service comprises a payment service, a shipping service, a video transcoding service, a storage service, a data collection service, or a visual reporting service.

20. The non-transitory computer readable storage medium of claim 11, further comprising instructions which cause the processor to:
  receive a failure notification indicating a failure to execute a transaction by another network service among the plurality of different network services in the workflow;
  roll back the respective custom transaction effected by the network service on behalf of the client application;
  identify either a previous network service in the workflow sequence or the client application; and
  send a failure notification to the previous network service in the workflow sequence or the client application.

21. A server device configured to provide a network service among a plurality of different network services in a decentralized network service workflow, the server device comprising:
  a processor;
  a memory; and
  the network service among the plurality of different network services in the workflow, wherein the network service is stored in the memory and executable by the processor, and wherein the network service is configured to:
  receive a workflow package, wherein the workflow package includes:
    an identification of a client application;
    identifications of the plurality of different network services in the workflow;
    workflow sequence information to engage the plurality of different network services according to a workflow sequence; and
    instruction sets for each of the plurality of different network services in the workflow, each instruction set including instructions configuring a corresponding network service to perform a respective custom transaction on behalf of the client application;
  wherein the plurality of different network services in the workflow comprise network services provided by a plurality of different providers, wherein network services in the workflow each execute on a respective server adapted to communicate with other network services via a respective remote network connection, and wherein network services in the workflow sequentially process the workflow package by receiving the workflow package, performing a respective custom transaction on behalf of the client application identified in the workflow package, and either sending the workflow package to a next network service in the workflow according to workflow sequence information included in the workflow package, or sending workflow completion information to the client application; and
  process the workflow package, wherein the network service is configured to:
    execute an instruction set from among the instruction sets in the workflow package to effect a respective custom transaction on behalf of the client application;
    identify either the next network service in the network service workflow or a return to the client application, wherein the next network service in the workflow is identified from among the plurality of different network services identified in the workflow package according to the workflow sequence information in the workflow package, and wherein the network service and the next network service are provided by different providers among the plurality of different providers;
    when the next network service is identified in the workflow, send the workflow package to the next network service provided by a different provider without interaction between the client application and the network service; and
    when a next network service is not identified in the network service workflow, send workflow completion information to the client application.

22. The server device of claim 21, wherein the workflow package comprises result storage instructions directing storage of transaction result information by each of the plurality of different network services to a common location, wherein the common location comprises a network storage location or a location within the workflow package, and wherein the network service is configured to store transaction result information in the common location according to the result storage instructions in the workflow package.

23. The server device of claim 21, wherein the workflow package comprises one or more log storage locations directing storage of log information by each of the plurality of different network services, and wherein the network service is configured to store log information in a storage location from among the one or more log storage locations.

24. The server device of claim 21, wherein identifying the next network service in the workflow comprises referencing a Uniform Resource Identifier (URI) in the workflow package that identifies the next network service.

25. The server device of claim 21, wherein an identification, in the workflow package, of one or more of the plurality of different network services in the workflow comprises an identified network service type along with real-time selection criteria, and wherein identifying, by the network service, the next network service in the workflow comprises determining a network service of the identified network service type according to the real-time selection criteria, from among a plurality of network services of the identified network service type.

26. The server device of claim 21, wherein the workflow package comprises an Extensible Markup Language (XML) package.

27. The server device of claim 21, wherein one or more of the instruction sets in the workflow package comprises one or more of a self-contained encoded message or a Uniform Resource Identifier (URI) along with instructions, and wherein the network service is configured to open the self-contained encoded message and/or access the URI to execute the instruction set from among the instruction sets in the workflow package.

28. The server device of claim 22, wherein the network service is configured to encrypt transaction result information.

29. The server device of claim 21, wherein the network service comprises a payment service, a shipping service, a video transcoding service, a storage service, a data collection service, or a visual reporting service.

30. The server device of claim 21, wherein the network service is configured to:
receive a failure notification indicating a failure to execute a transaction by another network service among the plurality of different network services in the workflow;
roll back the respective custom transaction effected by the network service on behalf of the client application;
identify either a previous network service in the workflow sequence or the client application; and
send a failure notification to the previous network service in the workflow sequence or the client application.

* * * * *

UNITED STATES PATENT AND TRADEMARK OFFICE
CERTIFICATE OF CORRECTION

| | | |
|---|---|---|
| PATENT NO. | : 9,258,355 B2 | Page 1 of 1 |
| APPLICATION NO. | : 13/822201 | |
| DATED | : February 9, 2016 | |
| INVENTOR(S) | : Chandra et al. | |

It is certified that error appears in the above-identified patent and that said Letters Patent is hereby corrected as shown below:

ON THE TITLE PAGE

Item (71), under "Applicant", in Column 1, Lines 2-3, delete "Wilmington (DE)" and insert -- Wilmington, DE (US) --, therefor.

Item (72), under "Inventors", in Column 1, Line 3, delete "Rangasumadram" and insert -- Rangasamudram --, therefor.

IN THE SPECIFICATION

In Column 1, Line 7, delete "§371" and insert -- § 371--, therefor.

In Column 1, Line 10, delete "§365" and insert -- § 365 --, therefor.

Signed and Sealed this
Thirty-first Day of May, 2016

Michelle K. Lee
*Director of the United States Patent and Trademark Office*